United States Patent [19]

Elser

[11] 4,417,501
[45] Nov. 29, 1983

[54] STEERING BOOSTER SYSTEM

[75] Inventor: Dieter Elser, Essingen, Fed. Rep. of Germany

[73] Assignee: Zahnradfabrik Friedrichshafen, AG, Friedrichshafen, Fed. Rep. of Germany

[21] Appl. No.: 283,470

[22] Filed: Jul. 15, 1981

[30] Foreign Application Priority Data

Jul. 25, 1980 [DE] Fed. Rep. of Germany ....... 3028176

[51] Int. Cl.³ .............................................. F15B 9/10
[52] U.S. Cl. ................................... 91/375 A; 180/146
[58] Field of Search ................. 91/375 R, 375 A, 370, 91/372, 373; 180/146, 147, 148

[56] References Cited

U.S. PATENT DOCUMENTS 3,935,790 2/1976 Goff ................................. 91/375 A
4,034,825 7/1977 Adams ............................. 91/375 A
4,200,030 4/1980 Elser ................................ 91/375 A Primary Examiner—Paul E. Maslousky
Attorney, Agent, or Firm—Zalkind & Shuster

[57] ABSTRACT

A booster steering device comprising a combined servomotor and rotary valve control is provided with means for returning the vehicle wheels to a straight ahead position after a steering operation wherein the hydraulic power of the servomotor is utilized for such return movement. The effect is achieved by a cam means actuated by manual steering force to add neutral return energy by twist of a torque rod over and beyond the stress necessary to return the control valve components to a neutral position. It has been found that such overstress results in an overtravel in relative motion of the flow control valve members in returning to neutral position, i.e., overtravel beyond neutral position, briefly. This occurs upon release of a steering force at the hand wheel. As a result of such overtravel, pressure flow to the servomotor is reversed from the direction in which it was going during the terminated steering operation and the servomotor powers the vehicle wheels to stright ahead position. Resiliency is provided in the cam means through a slotted coupling sleeve between the torque rod and a valve component, which stabilizes the construction and compensates for radial play and clearances between connected elements. Means are provided to adjustably position the coupling sleeve and preset the neutral position of the valve members.

20 Claims, 4 Drawing Figures

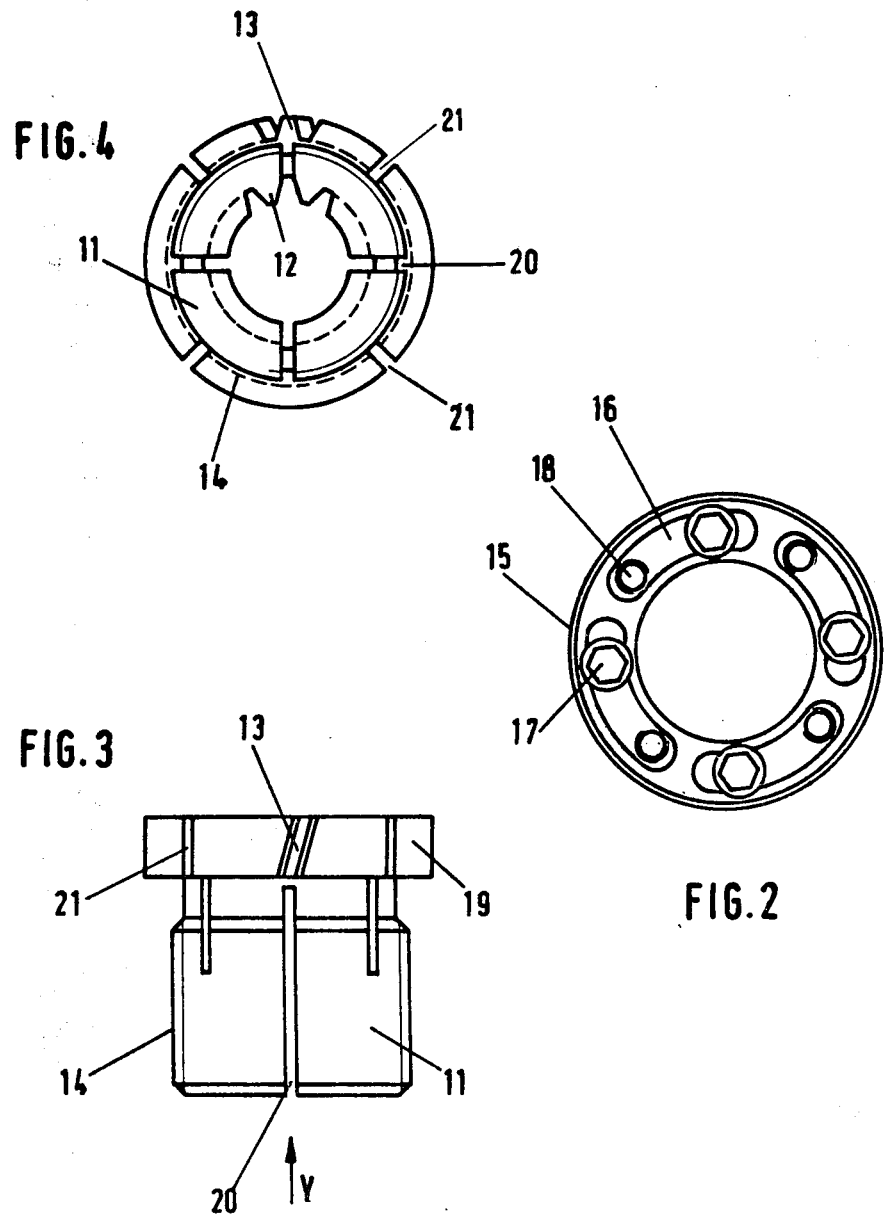

STEERING BOOSTER SYSTEM

Cross reference is made to my application, Ser. No. 283,456, filed July 15, 1981, and to my application, Ser. No. 299,325, filed Sept. 4, 1981.

BACKGROUND OF THE INVENTION

In booster steering devices of the kind described herein it has heretofore been known to rigidly connect a torque rod to the rotary valve plug of a rotary valve which valve plug is encompassed by a valve sleeve connected to the opposite end of the torque rod. Such devices are known in various patents such as U.S. Pat. No. 4,200,030 and German OS No. 23 45 384 wherein the U.S. patent discloses a ball-nut arrangement and the German publication discloses a rack type arrangement, both incorporated herein by reference.

The valve components have coacting grooves and upon relative roation of the components, one chamber of a servomotor is pressurized while the other is exhausted. A piston of the servomotor connects to the steering mechanism for operating the vehicle wheels.

The return of the vehicle wheels for straight ahead driving is generally accomplished by suitable axial geometry in various ways, but in order to provide return force, restoring energy is stored in the axial geometry during a steering operation. Thus the return force must be initially overcome during a steering movement and this requires considerable addition of steering energy.

THE PRESENT INVENTION

The construction of the present invention utilizes a coupling or connector sleeve which is slidably keyed to an end of the torque rod and effects a cam means connection to the valve sleeve. Such coupling sleeve has a threaded connection to the servomotor housing so that the coupling sleeve upon being rotated moves axially. This effects a camming action which rotates the torque rod in a twist direction opposite to the steering twist direction. This adds to the torsional stress initially applied to the torque rod by rotation of the manual steering wheel. Accordingly, at the end of the steering operation the torque rod will untwist to return the rotary valve plug beyond the usual neutral position up to the point where the torque rod is once again unstressed. This action produces a reversal of pressure and exhaust connections to the servomotor which then, by hydraulic power, returns the vehicle wheels to straight ahead position. The action is brief; by the time the torque rod is fully untwisted and the valve components once again in neutral relative position the vehicle wheels have been powered to straight position.

In order to provide proper radial clearance for the coupling sleeve, it is made with a certain amount of flexibility by having a group of longitudinal slots extending from each end. The groups overlap in length and are offset in circumferential array. Thus, a certain amount of radial flexibility is effected for the relatively moving parts constituting the valve sleeve, the coupling sleeve and the torque rod. Prestressed in assembly, the coupling sleeve is pressed into place to eliminate play.

Additionally, the construction permits adjustable rotation exteriorly of the housing of the torque rod, which, being rigidly pinned to the rotary valve plug, can adjust the rotary valve plug and the valve sleeve in exact neutral position.

ADVANTAGES OF THE INVENTION

The present invention eliminates the need for having to restore return force during the course of a steering movement by utilizing the servomotor itself for return force. Accordingly, the design of axial geometry for the purpose of restoring return force can be simplified and economy and steering energy saving effected. As a result, a smaller servomotor can be used for large and heavy vehicles eliminating need for dual circuit steering systems.

The invention provides a very simple manner in which hydraulic power can be utilized for return movement of vehicle wheels after steering operation and wherein the novel elements of the invention may be made very substantial and of simple design. For example, the slotting of the coupling sleeve utilizing two sets of slots which are peripherally offset provides stability.

Further, although the disclosure herein shows a cam means in the form of a tooth or teeth extending from the coupling sleeve into slanted grooves in the interior of the valve sleeve, various modifications are possible, such as reversal of parts and/or cam angles designed to effect any amount of additional twist in the torque rod. However, the number of teeth used is not critical for the cam means nor for a linear guide means wherein the coupling sleeve has teeth slidably keyed into longitudinal grooves of the torque rod. It is sufficient for purposes of the invention that the coupling sleeve have reasonably true axial movement free of radial play. The linear guiding and camming actions can be achieved by any suitable protuberance means coacting with respective groove means.

The invention will now be described in conjunction with the appended drawing in which:

FIG. 2 is a plan view of the end cover of the servomotor housing looking in the direction "X" of FIG. 1;

FIG. 3 is an enlarged view of a coupling sleeve, and

FIG. 4 is a plan view of the coupling sleeve looking in the direction "Y" of FIG. 3.

Figure 1:
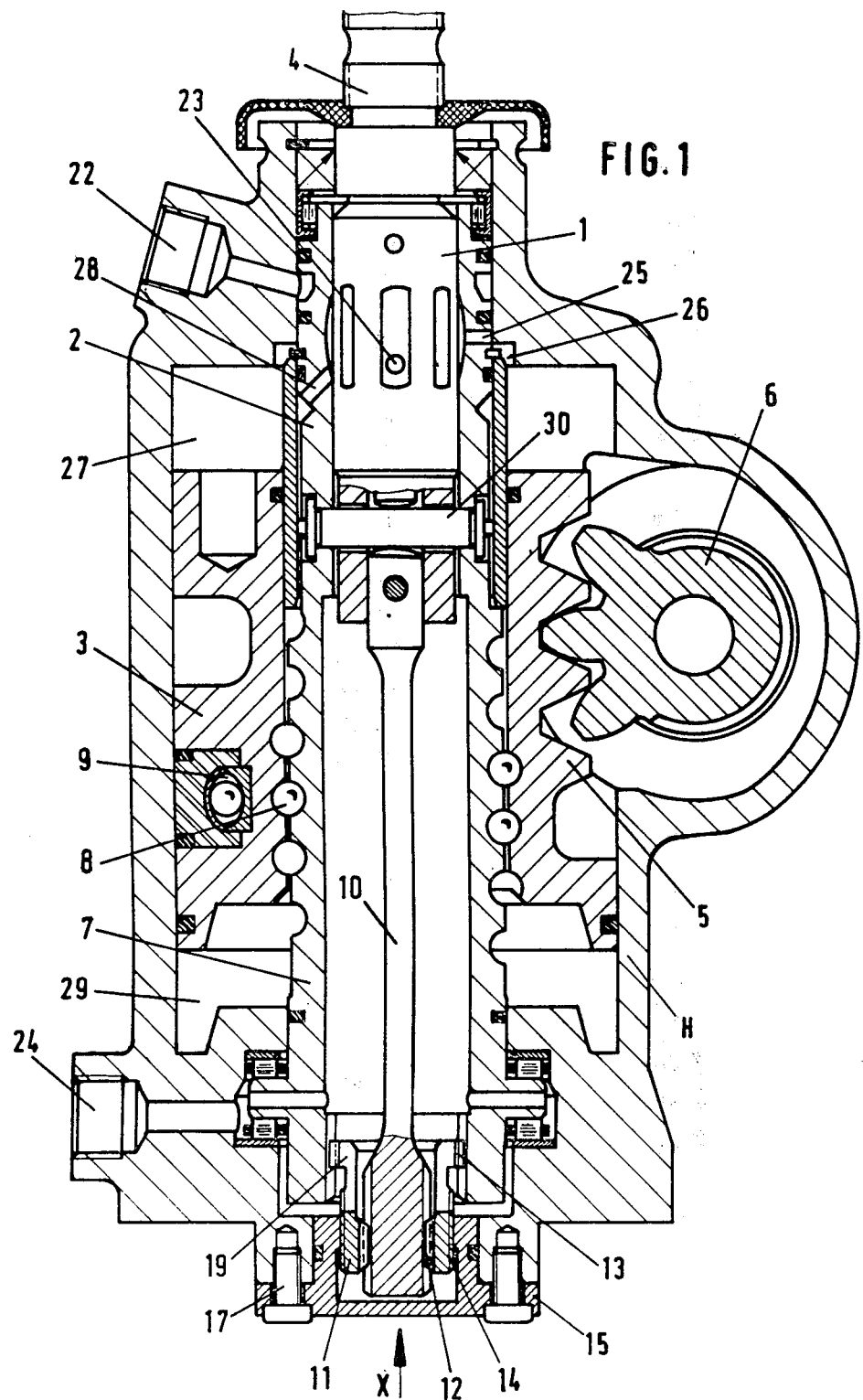
FIG. 1 is a longitudinal section through a ball-nut arrangement of a booster steering device incorporating the invention.

Referring to the drawing, a servomotor housing H is disclosed which in conventional fashion houses a rotary valve plug 1 encompassed by a valve sleeve 2 which valve components have coacting grooves for pressurizing and exhausting pressure chambers on each side of a piston 3 axially movable by a steering spindle stub 4. The piston has a rack 5 meshing with a gear sector of a stub steering shaft 6. A worm shaft 7 which may be integral with valve sleeve 2 is rotated within the piston 3 and connected thereto by a ball chain 8 having the return tube 9.

Rotary valve plug 1 is integrally connected to steering stub 4 and worm shaft 7 is connected to an end of a torque rod 10. Worm shaft 7 is connected to the other end of torque rod 10 through a coupling sleeve 11. The coupling sleeve is provided internally with a sliding keyway having teeth 12 in longitudinal grooves of the torque rod to guide the coupling sleeve in reciprocating relative to the torque rod. On its outer periphery coupling sleeve 11 has a cam means 13 which in the form shown may be merely teeth such as 13 operating in inclined grooves provided in the interior of worm shaft 7.

Elements 12, 13 are protuberance means which may be termed teeth or keys.

Alternatively, the longitudinal grooves with keys 12 and the inclined grooves with keys 13 may be reversed in position, i.e., with the inclined grooves being in the torque rod and the longitudinal grooves in the valve sleeve.

Coupling sleeve 11 has a threaded connection 14 with a cover 15 at the end of the housing which cover is in fixed position once adjuted in a manner to be described. Thus, upon rotation of coupling sleeve 11 it can be moved up and down as viewed in FIG. 1 by virtue of the threaded connection.

Cover 15 is rotatably adjustable by means of slots 16 (FIG. 2) through which screws 17 can protrude into the housing in suitably provided threaded bores for fastening the cover in adjusted portion. To provide for increase of adjustment threaded bores 18 are also provided. Rotative adjustment of the cover during assembly effects a neutral valve position since the coupling sleeve has relative motion with respect to worm shaft 7 and valve sleeve 2 via the cam means upon axial movement of the coupling sleeve on thread portion 14 between the cover and the coupling sleeve.

In order to effect an equalization of radial clearance the coupling sleeve 11 is made flexible by means of slots (FIGS. 3 and 4). To effect this, there is preferably provided a collar 19 extending radially from the coupling sleeve and which in this instance carries the teeth 13 of the cam means. A group of peripherally spaced longitudinally extended slots 20 and 21 extends from each end of the coupling sleeve, overlapping longitudinally the slots being offset peripherally between groups as shown. Thus, the slots can be made of sufficient length so as to design any degree of flexibility of the coupling sleeve against radial forces. Coupling sleeve 11 is under radial compression when in place to prevent steering play.

The slots may be arranged in groups of four as shown in FIG. 4. For clarity only a single tooth designated by the reference numeral 13 is illustrated in FIG. 4 although two such teeth for the sliding key guide means 12 are shown. However, the number of teeth is a matter of design and need not be a full circle.

As been heretofore mentioned, any particular type of cam means may be used whether teeth, or pins, etc. which travel in respective grooves of the worm shaft 7 and the inclination of the grooves will determine the oppositely directional and thus additional twisting stress put into the torque rod for return movement of the rotary valve plug beyond a neutral position. Such inclination may, if desired, provide a disproportionate degree of torque rod twist.

The assembly of the torque rod, via the coupling sleeve 11 to the worm shaft 7 is accomplished initially with radial pressure against the collar 19 allowing for radial compression of the coupling sleeve by virtue of the slots 20, 21. This ensures initial freedom from play. However, as previously mentioned, the coupling sleeve is radially resilient in order to compensate for any unequal clearance in a radial direction.

Pressure oil is supplied via port 22 with exhaust via transverse bore 23 in the interior of the tubular valve plug and thence to a valve sleeve groove for exhaust through port 24.

The flow control of the servomotor by the valve is by rotation of valve plug 1. For example, rotation in one direction pressurizes chamber 27 via transverse bore 25 and annular groove 26 from the pressure port 22 or, in the other direction pressurizes chamber 29 via bore 28 and the annular clearance between worm shaft 7 and the inner peripheral wall of piston 3. Accordingly, either chamber can be pressurized by a slight rotation of the valve plug 1 and the torque rod 10, dependent upon direction of rotation of steering stub 4 whereby relative rotation between the valve plug and the valve sleeve occurs, but is limited by the pin 30 in a manner set forth in U.S. Pat. No. 4,200,030.

OPERATION

When a steering rotation of stub shaft 4 is initiated there first occurs the usual twisting of torque rod 10 and flow control in the usual manner for pressurizing one chamber and exhausting the other. The valve plug 1 is thereby rotated within a determined control travel in relation to the valve sleeve 2. This control travel is obtained by means of the pin 30 which is fixed in the valve sleeve 2 and exits through a bore in the valve plug 1. The bore in the valve plug 1 is slightly larger than the diameter of the pin 30. The relative motion limited by the pin 30 and the bore determines the relative displacement of the control slots of the valve plug 1 and valve sleeve 2 to effect supply of pressurized fluid to one of the servomotor chambers 27 and 29 for hydraulic boost purposes. During rotation of stub shaft 4, hydraulic boost is effected by axial displacement of piston 3 to cause rotation of worm shaft 7 and the coupling sleeve to move axially on the threaded connection 14. This continues the twisting of torque rod 10 via coupling sleeve 11 and keys 13 in the coacting inclined grooves of the torque shaft. The torque rod 10 is twisted in a direction opposite to the direction of twist rotation effected by the steering force at stub shaft 4. In other words, the torque rod is being twisted at both ends in opposite directions which in effect increases the torsional stress applied during the steering operation. Thus, the stress introduced at the lower end is added to the stress at the upper end as viewed in FIG. 1. More specifically, simultaneous twisting of the torque rod in the opposite direction at the lower end is dependent on the degree of slant of the cam means grooves in the worm shaft. When the coupling sleeve is rotated by the worm shaft, it is caused to move axially at the threaded portion 14 in a direction dependent on the direction of rotation of stub shaft 4. The cam means therefore operates to rotate the coupling sleeve (guided to move linearly with respect to the torque rod) but causes twisting the torque rod in a direction of rotation opposite to that caused by the stub shaft 4.

Accordingly, the torque rod is increasingly stressed, but when manual force is released from the stub shaft, the torque rod becomes unstressed. After overcoming the full control travel the valve plug 1 is held, as a consequence of the additional prestressing of the torque rod, in a deflected position, until the torque rod is unstressed. The degree of prestressing of the torsion rod is performed in depence of the rotation of the steering wheel. In other words since the torque rod has been stressed beyond the point necessary to bring the rotary valve plug 1 back to neutral position, it will carry it beyond neutral position causing, briefly, reversal of pressure flow to the servomotor whereby the chamber which has just been exhausted becomes pressurized, reversing the steering direction of the vehicle wheels to a straight ahead position which is the point at which the torque rod becomes unstressed and the valve components are in neutral position.

Although a ball-nut device has been illustrated, it will be understood that the coupling sleeve 11 along with the cam means and the linear guide means can also be used in a rack type hydraulic steering device. All that is needed in such case is for the torque rod to extend through the pinion, for example, the pinion as shown in German OS 23 45 384. Accordingly, in such instance, the coupling sleeve along with the cam means and linear guide means is substituted for the connection of the torque rod to the valve sleeve by means of a transverse pin.

In retrospect, the invention has utility wherever a cam means connection, e.g., protuberance means and coacting groove means effects rotation of a coupling sleeve having protuberance means and coacting groove means for linear guidance, actuation by steering force being provided.

In a broader sence the concept of the invention utilizes an energy storage device, e.g., a torque rod or other means to initially store energy for control valve return to neutral responsive to rotation of a valve member during limited relative rotation of a pair of valve members in a steering operation, followed by an additive storage of energy by rotation of a coacting valve member when said valve members are subsequently rotated in unison. The net effect is to provide a movement of said valve members to a neutral position which provides a renewal of flow with respect to a servomotor to power the steered wheels of a vehicle back to straight ahead position.

I claim:

1. In a hydraulic booster steering system for motor vehicles having a housing (H) with a control valve therein comprising a rotary valve plug (1) encompassed by a valve sleeve member (2) wherein said rotary valve plug and valve sleeve member have relative rotation in opposite directions from a neutral position up to a predetermined limit and have coacting flow control grooves for pressure and exhaust of a servomotor having a piston (3) operative for vehicle wheel steering and intermediate pressure chambers (27, 29); including a torque rod member (10) having one end fixedly connected to the rotary valve plug with the other end having a connection (7, 11) to the valve sleeve member;

the improvement wherein the connection between said other end of said torque rod member and said valve sleeve member comprises a coupling sleeve (11);

said coupling sleeve having a cam means connection (13) with one of said members and a sliding guide connection (12) with the other of said members:

said coupling sleeve having a threaded connection (14) with said housing;

whereby steering rotation of said rotary valve plug effects a twisting of said torque rod member at said one end during relative rotation between said rotary valve plug and said valve sleeve member up to said predetermined limit after which rotation of said valve sleeve member causes rotation of said coupling sleeve and axial movement thereof on said threaded connection to effect rotation of said coupling sleeve by said cam means and twisting of said torque rod member at said other end through said sliding guide connection in a direction opposite to the direction of said first mentioned twisting of said torque rod member to thereby increased the stress therein so that, upon release of steering force, the unstressing of said torque rod member reverses the rotation of said rotary valve plug beyond said neutral position relative to said valve sleeve member for reversely pressurizing said servomotor for the returning of vehicle wheels to straight ahead position.

2. In a hydraulic booster steering system as set forth in claim 1, said housing having a cover (15); said threaded connection (14) comprising a threading therein;

said coupling sleeve (11) extending into said cover and having threaded engagement with said threading therein.

3. In a hydraulic booster steering system as set forth in claim 2, said cover having means for rotative adjustment on said housing to preset said control valve to said neutral position.

4. In a hydraulic booster steering system as set forth in claim 3, said rotative adjustment means comprising slots (16) through said cover and bores in said housing; screws (17) passing through said slots having fastening engagement with said bores.

5. In a hydraulic booster steering system as set forth in claims 1 or 2 or 3 or 4, said coupling sleeve being slotted to provide resilient engagement between said cam means connection and said sliding guide connection to radially stabilize said coupling sleeve against radial play.

6. In a hydraulic booster steering system as set forth in claim 1, said sliding guide connection (12) comprising radially extending protuberance means on said coupling sleeve;

said torque rod member being provided with a longitudinal groove means coacting with said aforesaid protuberance means.

7. In a hydraulic booster steering system as set forth in claim 6, a radially extending collar (19) on said coupling sleeve;

said cam means connection being thereon.

8. In a hydraulic booster steering system as set forth in claim 1, said cam means connection comprising radially extending protuberance means (13) of said coupling sleeve;

said valve sleeve member having a shaft extension (7) provided with helical groove means coacting with the last mentioned protuberance means.

9. In a hydraulic booster steering system as set forth in claim 1, said sliding guide connection comprising radially extending protuberance means (12) of said coupling sleeve;

said torque rod member being provided with a longitudinal groove means coacting with said aforesaid protuberance means;

said cam means connection comprising radially extending protuberance means (13) of said coupling sleeve;

said valve sleeve member having a shaft extension (7) provided with helical groove means coacting with the last mentioned protuberance means.

10. In a hydraulic booster steering system as set forth in claim 9, said coupling sleeve having peripherally spaced longitudinal slot means extending from each end for radial flexibility; the slots extending from one end being offset from the slots extending from the other end.

11. In a hydraulic booster steering system as set forth in claim 9, the sliding guide connection protuberance means (12) and the cam means connection protuberance means (13) being longitudinally spaced on said coupling sleeve.

12. In a hydraulic booster steering system as set forth in claim 8 or 9 or 10 or 11, said shaft extension comprising a worm shaft integrally secured to said valve sleeve;
said piston having a ball-nut connection with said worm shaft.

13. In a hydraulic booster steering system for a motor vehicle having a double acting servomotor, a housing and a flow control valve comprising valve members, one of which is supported for rotation in opposite directions to a limited extent from a neutral position for opening pressure flow to one chamber of the servomotor while opening exhaust flow from the other chamber of the servomotor;
the improvement residing in an arrangement for returning steered wheels of the vehicle to a straight ahead position comprising energy storing means (10) operatively connected to said one (1) of said valve members and responsive to said rotation thereof for storing energy to be used in returning said one of said valve members to said neutral position;
cam means (11) operatively connected to the other (2) of said valve members and to said housing (H) and responsive to rotation of the other (2) of said valve members by the servomotor for increasing said energy stored;
whereby said one of the valve members when returning toward said neutral position overtravels to reverse the pressure and and exhaust flow to the chambers of said servomotor and thereby hydraulically power the steered wheels toward the straight ahead position.

14. In a hydraulic booster steering system as set forth in claim 13, said energy storing means comprising a torque rod (10) and said cam means (11) comprising a coupling sleeve;
said other valve member having an integrally connected worm shaft (7);
said coupling sleeve being intermediate said worm shaft and said torque rod and a movable connection means to each.

15. In a hydraulic booster steering system as set forth in claim 14, said cam means comprising a linear sliding key connection (12) with said torque rod and a cam connection means (13) with said worm shaft;
said coupling sleeve having a threaded connection (25) with said housing.

16. In a hydraulic booster steering system as set forth in claim 14, said cam means comprising a radially flexible coupling sleeve disposed in prestress assembly with said worm shaft and torque rod.

17. In a hydraulic booster steering system as set forth in claim 15, said coupling sleeve being intermediate said worm shaft and said torque rod and being slotted for radial flexibility to eliminate play between said worm shaft, coupling sleeve and torque rod.

18. In a fluid power steering system having a steering spindle (1), a fluid servomotor (3), a member (7) driven by the servomotor, valve means (1-2) responsive to manual displacement of the spindle to a displaced position from a neutral position relative to the driven member for powering the servomotor in a corresponding operational direction, said valve means including a valve member displaceable by said manual displacement of the spindle and energy storing means (10) operatively connected to the spindle and the driven member for exerting a restoring force resisting said displacement of the spindle from the neutral position, the improvement residing in powering the servomotor in a reversed operational direction upon release of the valve member and the steering spindle from the displaced position, comprising means (11) increasing said restoring force exerted on the spindle in the displaced position for effecting overtravel return movement thereof beyond the neutral position to briefly power the servomotor in the reversed operational direction.

19. The improvement as defined in claim 18 wherein said restoring force increasing means comprises a coupling element operatively connected to the energy storing means and the driven member, means (14) responsive to rotation of the driven member for displacing the coupling element relative to the driven member, and cam means (13) responsive to said relative displacement of the coupling element for increasing the restoring force as a function of said manual displacement of the spindle.

20. The combination of claim 19 wherein the energy storing means comprises a torque rod to which torsional stress is applied by said manual displacement of the spindle and by said relative displacement of the coupling element.

* * * * *